United States Patent
Yu et al.

(10) Patent No.: US 7,489,138 B2
(45) Date of Patent: Feb. 10, 2009

(54) DIFFERENTIAL ARC FAULT DETECTION

(75) Inventors: Wenjiang Yu, Mississauga (CA);
Zhenning Liu, Mississauga (CA); Yang Ye, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 244 days.

(21) Appl. No.: 11/606,076

(22) Filed: Nov. 30, 2006

(65) Prior Publication Data

US 2008/0129307 A1    Jun. 5, 2008

(51) Int. Cl.
*G01R 31/42* (2006.01)
*H02H 3/00* (2006.01)

(52) U.S. Cl. .......................... 324/536; 324/522; 361/42
(58) Field of Classification Search ................ 324/536, 324/522, 531; 361/42
See application file for complete search history.

(56) References Cited

U.S. PATENT DOCUMENTS

| | | | |
|---|---|---|---|
| 5,659,453 A | 8/1997 | Russell et al. | |
| 5,963,406 A | 10/1999 | Neiger et al. | |
| 5,986,860 A | 11/1999 | Scott | |
| 6,347,027 B1 | 2/2002 | Nelson et al. | |
| 6,496,342 B1 | 12/2002 | Horvath et al. | |
| 6,625,550 B1 | 9/2003 | Scott et al. | |
| 6,772,077 B1 | 8/2004 | Parker et al. | |
| 6,782,329 B2 | 8/2004 | Scott | |
| 6,822,457 B2 | 11/2004 | Borchert et al. | |
| 6,861,845 B2 | 3/2005 | Taylor et al. | |
| 6,943,558 B2 | 9/2005 | Hale et al. | |
| 6,985,800 B2 | 1/2006 | Rehtanz et al. | |
| 6,987,389 B1 | 1/2006 | Macbeth et al. | |
| 7,005,995 B2 | 2/2006 | Hornsby et al. | |
| 7,024,320 B2 | 4/2006 | Rogovin | |
| 7,068,480 B2 | 6/2006 | Wong et al. | |
| 7,099,784 B2 | 8/2006 | Spitaels et al. | |
| 2004/0010350 A1 | 1/2004 | Lof et al. | |
| 2004/0156154 A1 | 8/2004 | Lazarovich et al. | |
| 2004/0263183 A1* | 12/2004 | Naidu et al. ................ | 324/536 |
| 2005/0017731 A1* | 1/2005 | Zuercher et al. ............ | 324/536 |
| 2005/0057261 A1* | 3/2005 | Hale et al. .................. | 324/536 |
| 2005/0057869 A1 | 3/2005 | Hale et al. | |

* cited by examiner

*Primary Examiner*—Vincent Q Nguyen
(74) *Attorney, Agent, or Firm*—Oral Caglar, Esq.

(57) ABSTRACT

A method and apparatus detect arc faults. The method and apparatus may digitally detect current and voltage signals at a master node (111) positioned at a first point in a wiring system (131). At a second point in the wiring system (131), a slave node (122) may digitally detect current and voltage signals. An arc fault that develops between the first and second points in the wiring system (131) may be detected by comparing the current signals from the master node (111) and from the slave node (122), and comparing the voltage signals from the master node (111) and from the slave node (122).

17 Claims, 7 Drawing Sheets

DIFFERENTIAL ARC FAULT DETECTION

BACKGROUND OF THE INVENTION

1. Field of the Invention

The present invention relates to electric power distribution systems, and more particularly to a method and apparatus for detecting series and parallel arc faults for electric power systems.

2. Description of the Related Art

Electrical systems used in complex environments such as aerospace systems, industrial environments, vehicles, and residential environments include a large number of electrical circuits, devices, and wires. Arc faults may occur in any of the electrical circuits, or along the wires. If not detected promptly, arc faults may cause short circuits, malfunctions, and fires in the equipment serviced by the electrical circuits or wires exhibiting arc faults.

Arc fault detection and protection pose a significant challenge in such complex environments. Correct and prompt arc fault detection and protection are critical in aircraft environments. Airlines, aircraft manufacturers, the military, and various regulatory agencies have expressed the need for accurate and fast arc fault detection and protection systems, to improve the aircraft wiring safety. A method and system that can reliably detect and prevent series and parallel arcs in electric power systems and enhance wiring system protection, is needed.

Integration of typical/conventional arc fault detection techniques in aircraft electrical systems presents significant challenges. Some of these challenges are associated with the presence of higher and variable AC line frequencies in aircraft systems, a need for DC protection, lack of ground return wires which are typically required for Ground Fault type protection, cross-talk between adjacent wires in the same wire bundle, and a need for zero-tolerance for nuisance trips.

Arc faults in aircraft electric systems can be classified into four categories, based on the methods used to characterize the arcs. Tests used to characterize arcs include the guillotine arc or point contact test, the wet arc or salt water drip test, the loose terminal test, and the carbonized path test. Various arc faults that can be characterized by these tests have different signatures adding challenges to the detection of arc faults. Moreover, some arc fault signatures become inconspicuous in environments that exhibit cross-talk, common source impedance feedback, transient aircraft load characteristics, etc.

Transient aircraft load characteristics pose major challenges for arc detection. Aircraft equipment and standard aircraft loads can produce anomalous waveform signatures during normal operating conditions. Loads and equipment that can produce anomalous waveform signatures include motors (during motor start-up), strobe lights, landing lights, buses (during bus transfers), transformer rectifiers, incandescent and fluorescent lighting loads, and mechanical switches (during opening and closing). Such loads, as well as other transient process conditions can exhibit signatures that mimic, or are indicative of arc conditions. Differentiating such false arc fault alarms from real arc fault occurrences is important on an aircraft.

Some arc fault detection technologies projected for integration in aircraft systems, require understanding and modeling of the arc fault current/voltage signatures and of the normal steady state behavior and transient behavior of the aircraft electric system. Given the large variation in aircraft systems and loads, an algorithm that relies solely on the content of the current/voltage signals cannot be immune to nuisance trips, Hence, such arc fault detection technologies provide unreliable performance.

Disclosed embodiments of this application address these and other issues by utilizing differential arc fault detection methods and apparatuses that detect arc faults using arcing content of current/voltage signals, and eliminate potential nuisance trips by canceling from the sensed current/voltage signals, the content of interferences such as load characteristics, cross-talks, etc. In one embodiment, an arc fault detection master node and slave node sample voltage signals and compare the sampled values to determine whether a series arc has occurred; and sample current signals and compare the sampled values to determine whether a parallel arc has occurred.

SUMMARY OF THE INVENTION

The present invention is directed to a method and apparatuses for detecting arc faults in electric systems. According to a first aspect of the present invention, an apparatus for detecting arc faults comprises: a master node for digitally detecting a current signal and a voltage signal at a first point in a wiring system; a slave node for digitally detecting a current signal and a voltage signal at a second point in the wiring system; and a detection unit for detecting an arc fault in the wiring system by comparing the current signals from the master node and from the slave node, and comparing the voltage signals from the master node and from the slave node.

According to a second aspect of the present invention, an apparatus for detecting arc faults comprises: a master node for detecting a current signal and a voltage signal at a first point in a wiring system; a slave node for detecting a current signal and a voltage signal at a second point in the wiring system, wherein an arc fault is detected in the wiring system by comparing the current signals from the master node and from the slave node, and comparing the voltage signals from the master node and from the slave node; and a communication pathway for data and timing communication between the master node and the slave node.

According to a third aspect of the present invention, a method of detecting arc faults comprises: detecting a current signal and a voltage signal at a first point in a wiring system; detecting a current signal and a voltage signal at a second point in said wiring system; detecting an arc fault in the wiring system by comparing the current signals at the first and second points, and comparing the voltage signals at the first and second points; and communicating data and timing information between the first point and the second point.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
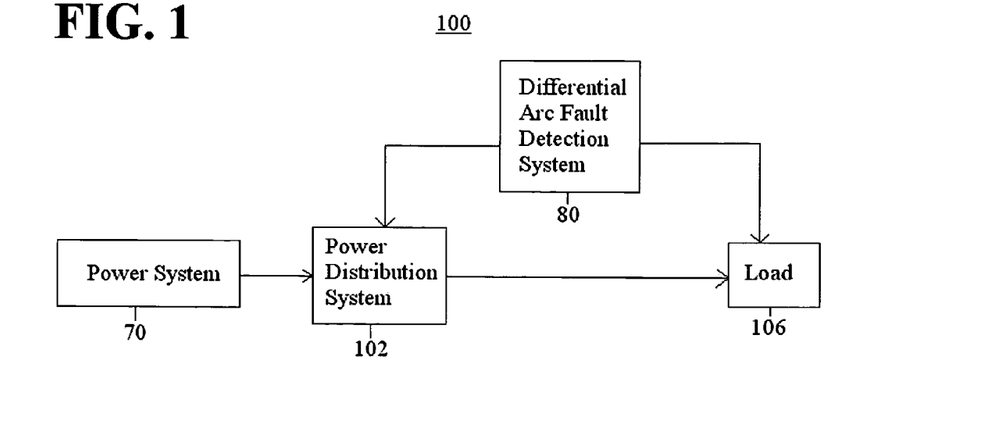
FIG. 1 is a block diagram of an electrical system containing a differential arc fault detection system according to an embodiment of the present invention.

Aspects of the invention are more specifically set forth in the accompanying description with reference to the appended figures. FIG. 1 is a block diagram of an electrical system containing a differential arc fault detection system according to an embodiment of the present invention. The electrical system 100 illustrated in FIG. 1 includes the following components: a power system 70; a power distribution system 102; a differential arc fault detection system 80; and a load 106. Operation of the electrical system 100 in FIG.1 will become apparent from the following discussion.

Electrical system 100 may be associated with an aircraft, a ship, a laboratory facility, an industrial environment, a residential environment, etc. The power system 70 provides electrical energy in electrical system 100. The power system 70 may include a generator of a vehicle, a generator for an industrial facility, etc., and includes electrical circuits and components such as transformers, rectifiers, filters, battery banks, etc.

The power distribution system 102 conditions and distributes power from power system 70 to various loads in electrical system 100. The power distribution system 102 may include various electrical components, such as circuit breakers, switches, controllers, etc.

The load 106 receives electric power from the power distribution system 102. Load 106 includes electric circuits, and may be any system used in an electrical environment.

Differential arc fault detection system 80 can detect arcs in electronic components and wires included between the power distribution system 102 and load 106. Fuses, Solid State Power Controllers (SSPCs), arrestors, transorbs, circuit breakers, sensing equipment, circuit interrupters, wires, etc., may also be included in differential arc fault detection system 80.

Although the systems in electrical system 100 are shown as discrete units, it should be recognized that this illustration is for ease of explanation and that the associated functions of certain functional modules can be performed by one or more physical elements.

Figure 2:
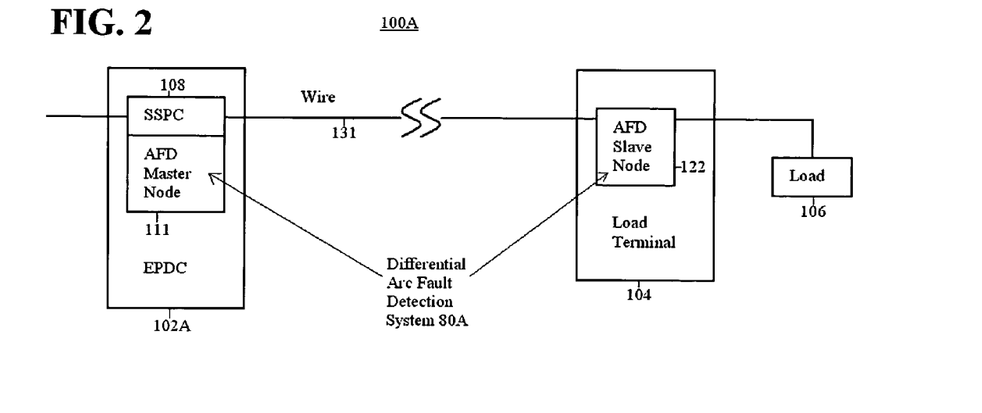
FIG. 2 is an exemplary block diagram of an electrical system containing a differential arc fault detection system according to an embodiment of the present invention.

FIG. 2 is an exemplary block diagram of an electrical system containing a differential arc fault detection system 80A according to an embodiment of the present invention. The differential arc fault detection system 80A illustrated in FIG. 2 protects the wiring 131 from an Electrical Power Distribution Center (EPDC) 102A to the input of a load 106. The differential arc fault detection system 80A includes an Arc Fault Detection (AFD) master node 111 at the EPDC 102A, and an AFD slave node 122 mounted at the input terminal of the load 106. The AFD master node 111 can be combined into a Solid Switch Power Control (SSPC) channel 108.

Figure 3A:
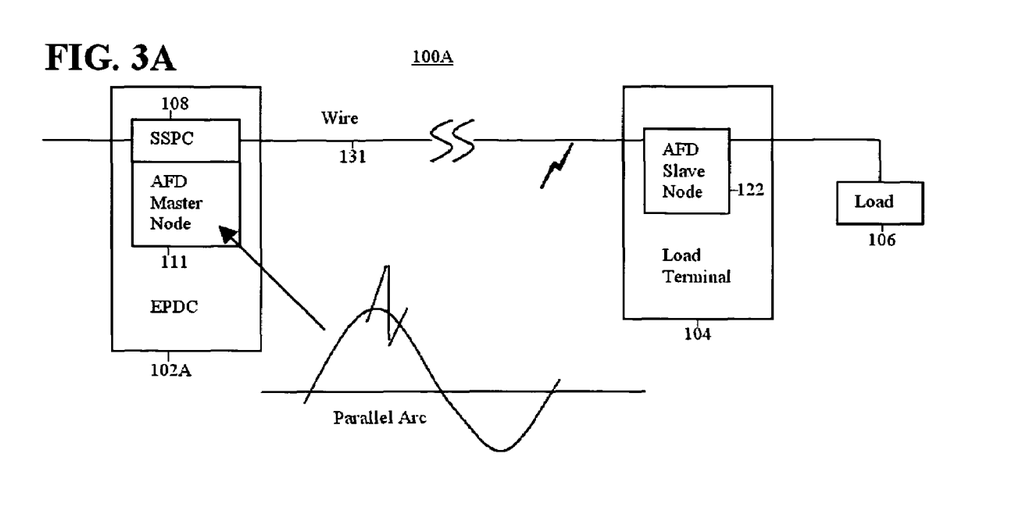
FIG. 3A is an exemplary block diagram of an electrical system containing a differential arc fault detection system sensing a parallel arc according to an embodiment of the present invention illustrated in FIG. 2.
Figure 3B:
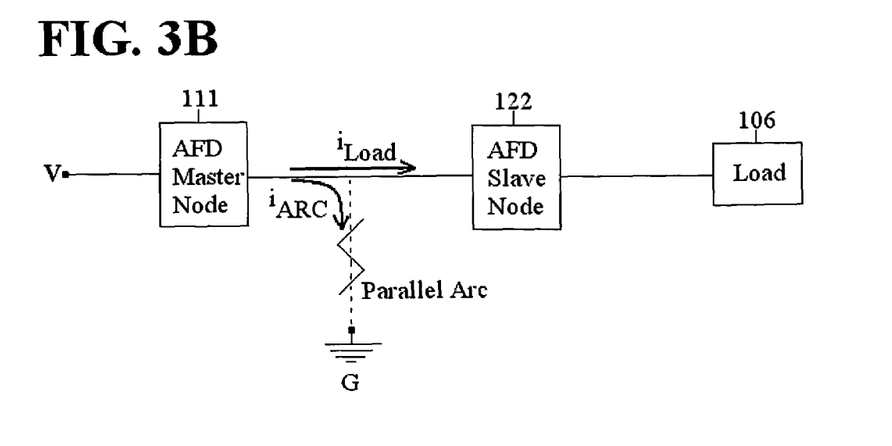
FIG. 3B is an equivalent circuit diagram of an electrical system containing a differential arc fault detection system sensing a parallel arc according to an embodiment of the present invention illustrated in FIG. 3A.
Figure 3C:
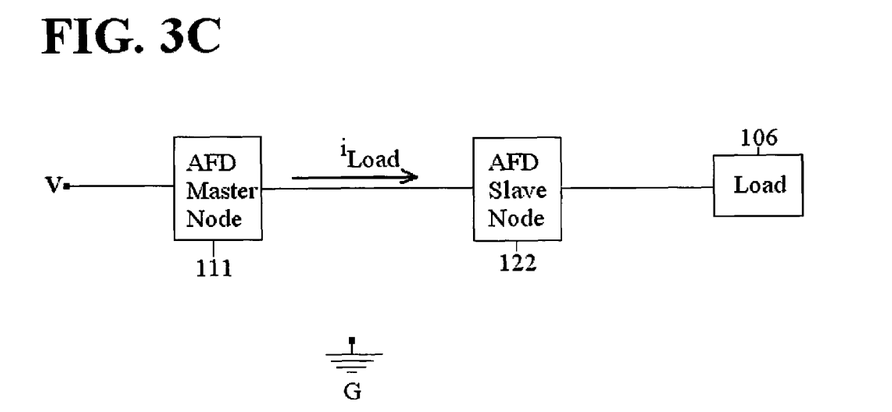
FIG. 3C is an equivalent circuit diagram of an electrical system containing a differential arc fault detection system, without an arc occurrence, according to an embodiment of the present invention illustrated in FIG. 2.

FIG. 3A is an exemplary block diagram of an electrical system 100A containing a differential arc fault detection system sensing a parallel arc according to an embodiment of the present invention illustrated in FIG. 2. FIG. 3B is an equivalent circuit diagram of the electrical system 100A containing a differential arc fault detection system sensing a parallel arc according to an embodiment of the present invention illustrated in FIG. 3A. FIG. 3C is an equivalent circuit diagram of the electrical system 100A containing a differential arc fault detection system, without an arc occurrence, according to an embodiment of the present invention illustrated in FIG. 2.

When no arc is present in the system 100A, a voltage V generates a current $i_{Load}$ that reaches the load 106. The current $i_{Load}$ passes through AFD master node 111 and AFD slave node 122, as illustrated in FIG. 3C.

When a "parallel arc" occurs on the wire, as illustrated in FIG. 3A, an electrical path is created between electrical lines, or from a line to ground, in parallel with the load. When an electrical path is created, for example, between the wire 131 and the ground G, an arcing current $i_{ARC}$ sinks to ground, as illustrated in the equivalent circuit in FIG. 3B.

Hence, the AFD master node 111 will see a current signal containing arcing content. For example, in the equivalent circuit of FIG. 3B, the AFD master node 111 will see a current signal containing both the load current $i_{Load}$ and the arcing current $i_{ARC}$.

The slave node 122 on the other hand, will see a different current signal. For example, in the equivalent circuit of FIG. 3B, the slave node 122 will see a current signal containing only the load current $i_{Load}$.

Therefore, a difference between the two signals seen by the master node 111 and the slave node 122 represents the manifested arcing content. For example, for the equivalent circuit of FIG. 3B, the difference between the two signals seen by the master node 111 and the slave node 122 represents the arcing current $i_{ARC}$.

The difference between the two signals seen by the master node 111 and the slave node 122 may be compared to a current threshold that is larger that the normal leakage current, to determine whether the difference represents arcing current. In one implementation, the current threshold may be determined previously, off-line or on-line.

Figure 4A:
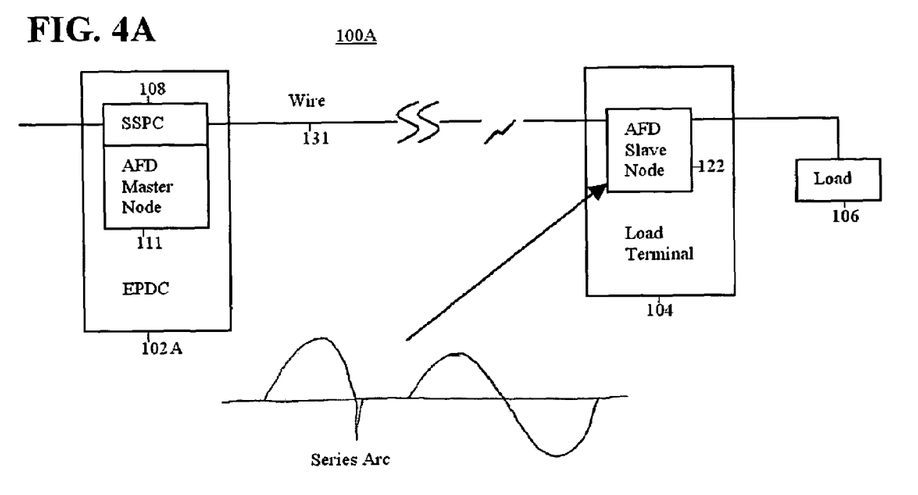
FIG. 4A is an exemplary block diagram of an electrical system containing a differential arc fault detection system sensing a series arc according to an embodiment of the present invention illustrated in FIG. 2.
Figure 4B:
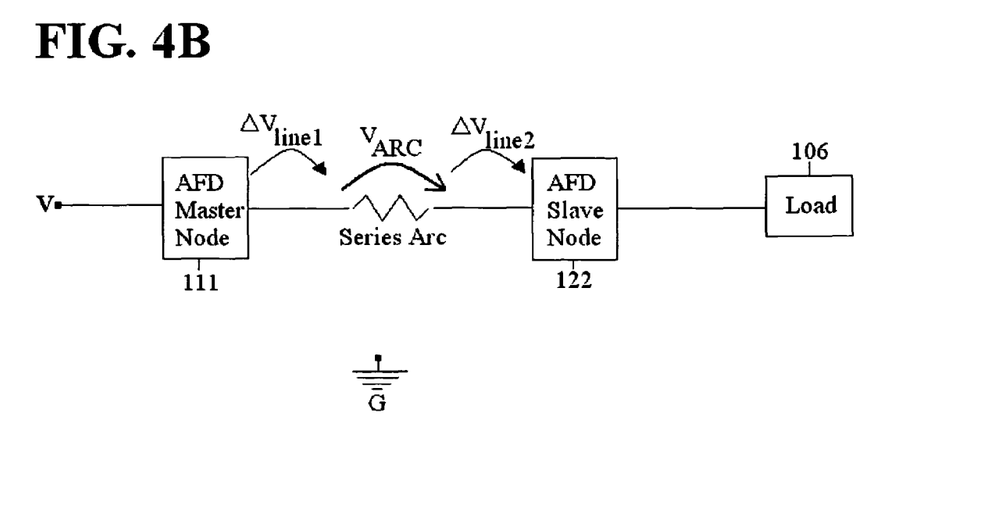
FIG. 4B is an equivalent circuit diagram of an electrical system containing a differential arc fault detection system sensing a series arc according to an embodiment of the present invention illustrated in FIG. 4A.
Figure 4C:
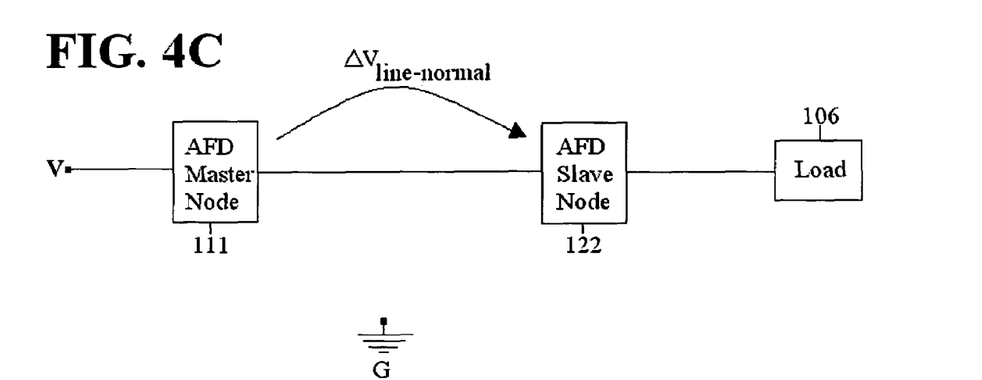
FIG. 4C is an equivalent circuit diagram of an electrical system containing a differential arc fault detection system, without an arc occurrence, according to an embodiment of the present invention illustrated in FIG. 2.

FIG. 4A is an exemplary block diagram of an electrical system 100A containing a differential arc fault detection system sensing a series arc according to an embodiment of the present invention illustrated in FIG. 2. FIG. 4B is an equivalent circuit diagram of the electrical system 100A containing a differential arc fault detection system sensing a series arc according to an embodiment of the present invention illustrated in FIG. 4A. FIG. 4C is an equivalent circuit diagram of the electrical system 100A containing a differential arc fault detection system, without an arc occurrence, according to an embodiment of the present invention illustrated in FIG. 2.

Series arc faults occur on wires, in series with a load. Series arc fault currents typically have low energy levels, and are difficult to detect. Conventional circuit breakers, currently in widespread use in the aerospace and general residential and industrial environments, are designed to detect only overcurrent and overload conditions, and do not detect series arc faults. Numerous electrical incidents are caused by low energy level arc fault conditions resulting from damaged or aging wire.

With the arc fault detection system illustrated in FIGS. 4A, 4B, and 4C, however, series arc faults are detected. When no arc is present in the system 100A, a voltage V supplies the load 106, as illustrated in FIG. 4C. When a series arc occurs on the wire 131, as illustrated in FIG. 4A, an arcing content appears on the wire, in series with the load. In the equivalent circuit of the electrical system 100A in FIG. 4B, an arcing content, such as, for example, an arcing voltage $V_{ARC}$ appears on the wire 131 between the master node 111 and the slave node 122.

Hence, the slave node 122 will see a reduced voltage due to arcing content. The master node 111, however, will see a different voltage signal. In the equivalent circuit of the electrical system 100A in FIG. 4B, the master node 111 will see a normal voltage signal, without the arcing voltage $V_{ARC}$.

Therefore, the difference between the two signals seen by the master node 111 and the slave node 122 represents the manifested arcing content. For example, for the equivalent circuit of FIG. 4B, the difference between the two signals seen by the master node 111 and the slave node 122 represents the arcing voltage $V_{ARC}$.

The difference between the two signals seen by the master node 111 and the slave node 122 may be compared to a voltage threshold that is larger than the normal line drop, to detect whether the difference represents arcing current. In one implementation, the voltage threshold may be determined previously, off-line or on-line.

Hence, as described at FIGS. 3A, 3B, 3C, and 4A, 4B, and 4C, the master node and the slave node will see different electrical values for electrical parameters, thus exposing the arcing content for a parallel or series arc.

When arcing or arcing-like content is induced into the wire 131 by electrical events occurring outside of the detection region, the master node and the slave node will see the same voltage signal with arcing or arcing-like content. The detection region is the region between the master node 111 and the slave node 122. If arcing content is induced into the wire 131 by cross-talk or common source impedance feedback, then the master node and the slave node will see the same voltage signal with arcing or arcing-like content, hence the difference between the master node voltage and the slave node voltage will not show an arcing content. Also, if the load characteristics contain an arcing-like behavior, then the master node and slave node will see the same current signal including arcing-like content. Hence, the difference between the master node current and the slave node current will not show an arcing content.

Hence, the arc fault detection techniques and apparatuses described in the current application detect parallel and series arcs, and at the same time eliminate potential nuisance trips, by canceling the content of interferences such as load characteristics, cross-talks, common source impedance feedback, etc., from sensed current/voltage signals.

Figure 5:
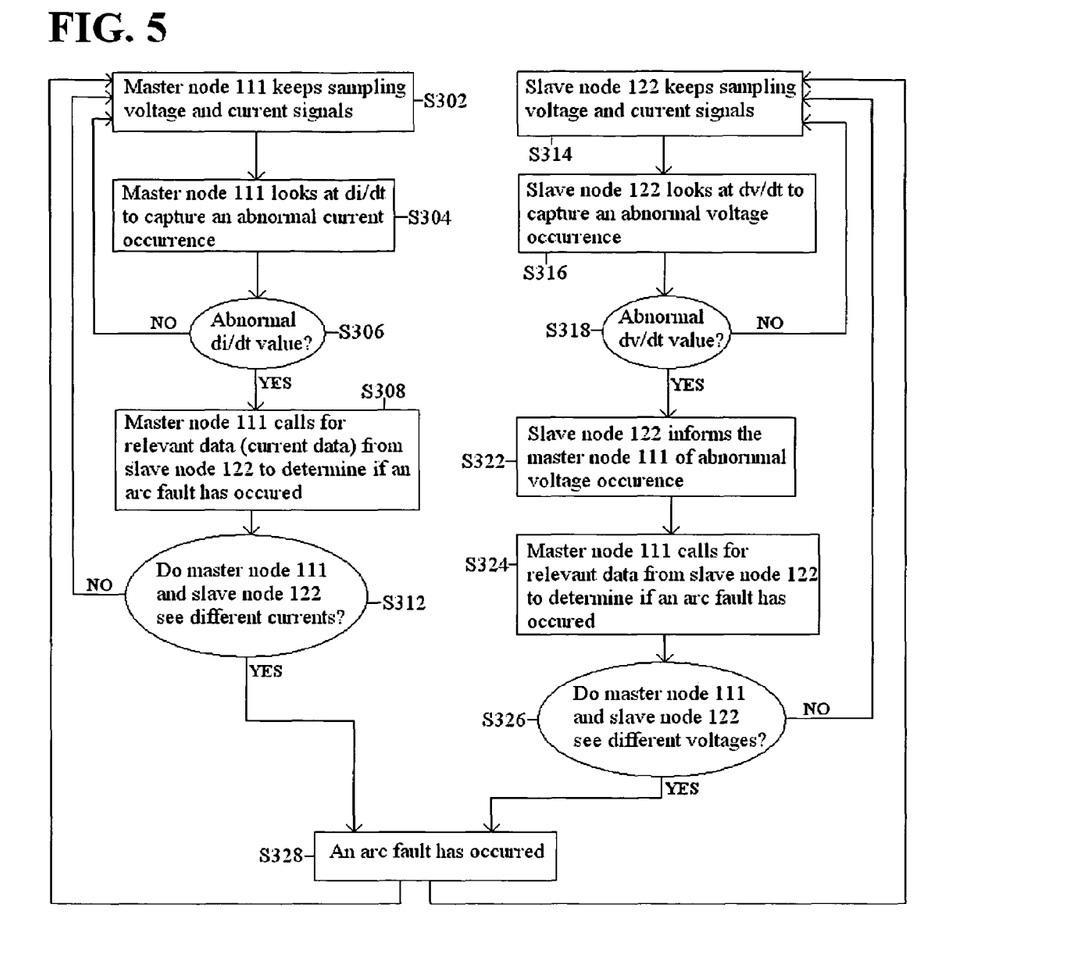
FIG. 5 is a flow diagram illustrating operations performed by a differential arc fault detection system to detect arc faults according to an embodiment of the present invention illustrated in FIGS. 3A and 4A.

FIG. 5 is a flow diagram illustrating operations performed by a differential arc fault detection system to detect arc faults according to an embodiment of the present invention illustrated in FIGS. 3A and 4A. The master node 111 keeps sampling the voltage and current signals (S302) associated with an electrical system, such as, for example, the electrical system illustrated in FIGS. 3A and 4A.

Series and parallel arcs produce abnormal di/dt values. A threshold is associated with normal di/dt values. This threshold can be set, for example, as low as the peak of the di/dt value of the rated sinusoidal load.

The arc detection function can then be triggered by a comparison between an abnormal di/dt value and the threshold associated with normal di/dt values. For this purpose, the master node 111 looks at the variation of current with time, di/dt, to capture an abnormal current occurrence (S304). When the master node 111 captures an abnormal current occurrence (S306), it calls for relevant data, such as electrical current data, from the slave node 122, to determine whether an arc fault has occurred (S308). A comparison is triggered between the master node electrical data and the slave node electrical data. If currents at the master node 111 and at the slave node 122 are different (S312), a parallel arc has occurred on a wire (S328). Step S312 may also include a comparison between a current threshold, and the difference between currents at the master node 111 and slave node 122, to determine whether an arc has occurred.

The slave node 122 also keeps sampling the voltage and current signals (S314) associated with the electrical system.

Series and parallel arcs produce abnormal dv/dt values. A threshold is associated with normal dv/dt values. This threshold can be set, for example, as low as the peak of the dv/dt value of the rated sinusoidal load.

The arc detection function can then be triggered by a comparison between an abnormal dv/dt value and the threshold associated with normal dv/dt values. For this purpose, the slave node 122 looks at the variation of voltage with time, dv/dt, to capture an abnormal voltage occurrence (S316). When the slave node 122 captures an abnormal voltage occurrence (S318), it informs the master node 111 of the abnormal voltage occurrence (S322). The master node 111 then calls for relevant data, such as voltage data, from the slave node 122, to determine whether an arc fault has occurred (S324). A comparison is triggered between the master node electrical data and the slave node electrical data. If voltages at the master node 111 and at the slave node 122 are different (S326), a series arc has occurred on a wire (S328). Step S326 may also include a comparison between a voltage threshold, and the difference between voltages at the master node 111 and slave node 122, to determine whether an arc has occurred.

Voltage and current sampling at the master node 111 and at the slave node 122 may continue in order to determine arc fault occurrences in real time.

Detection operations for the differential arc fault detection system 80 may also use the RMS (root mean square) of digitalized information, to detect the arc fault influence in the voltage and current characteristics. In one exemplary implementation, the RMS of the current/voltage difference between two nodes (master node and slave node) is calculated. The calculated RMS is then compared with a threshold, to detect whether an arc has occurred.

In a preferred embodiment of the current invention, the master node and the slave node are synchronized to each other with a "time tick", which periodically exchanges timing information from one node to the other node. The time tick also serves as a heart beat signal, to monitor the operational status and integrity of the differential arc fault detection system. Data sampling at the two nodes is synchronized to this time tick, so that data from one side (one of the nodes) is relevant time-wise, to the data from the other side (the other node).

Figure 6:
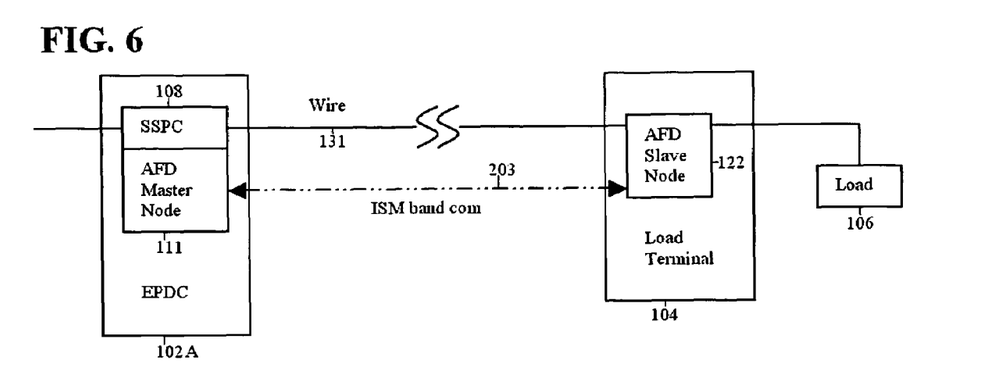
FIG. 6 illustrates an exemplary implementation for a differential arc fault detection system according to an embodiment of the present invention.

FIG. 6 illustrates an exemplary implementation for a differential arc fault detection system according to an embodiment of the present invention. FIG. 6 illustrates a wireless communication based implementation for a differential arc fault detection system. In this implementation, the master node 111 and the slave node 122 can exchange time tick signals and communicate sampled data, such as sampled current and voltage values, through industrial, scientific and medical (ISM) band short distance wireless communication within certain distance ranges.

Figure 7:
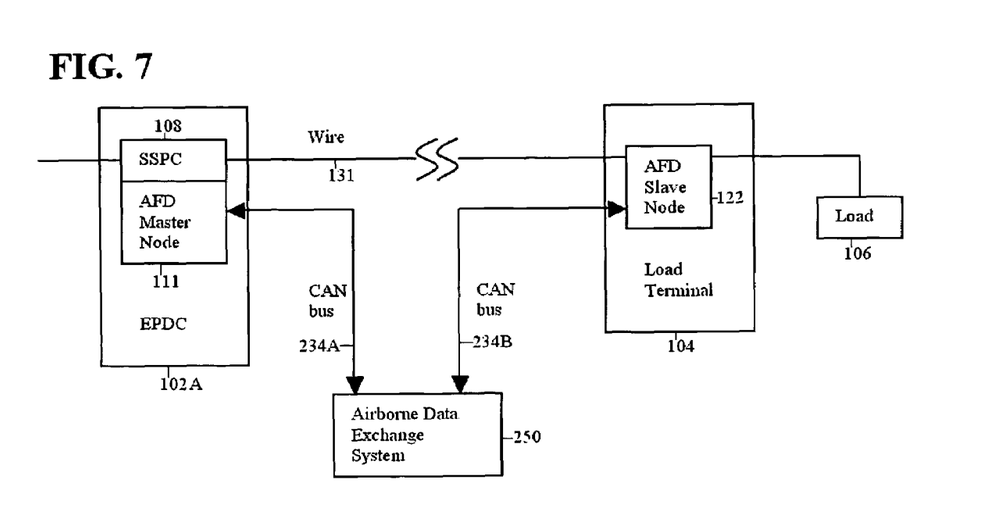
FIG. 7 illustrates another exemplary implementation for a differential arc fault detection system according to an embodiment of the present invention.

FIG. 7 illustrates another exemplary implementation for a differential arc fault detection system according to an embodiment of the present invention. FIG. 7 illustrates a Controller Area Network (CAN) bus based implementation for a differential arc fault detection system. In this implementation, the master node 111 and the slave node 122 can exchange time tick signals and communicate sampled data, such as sampled current and voltage values, through CAN buses 234A and 234B and airborne data exchange system 250. Time tick signals and sampled data may be sent from the master node and the slave node to the airborne data exchange system 250 through CAN busses. Time tick signals and sampled data are then sent from the airborne data exchange system 250 to the slave node and the master node.

Other communication pathways for data and timing communication between the master node and the slave node can also be implemented, besides wireless communication and CAN bus based implementation.

The embodiments described in the present invention provide new methods and apparatuses for detection of series and parallel arcs on wires, by comparing, or by calculating differences between instantaneous voltage and current characteristics from two ends of the wire. The methods described in the present invention provide arc fault detection algorithms that can be implemented efficiently in hardware or software, have a fast response time, and have small memory usage. The methods and apparatuses described in the present invention detect arc faults in a single wire or in multiple wires; perform real time voltage and current measurements and detect arc faults in real time; provide protection from arc faults in AC and DC electrical distribution systems; provide local wire protection and monitoring; protect wiring from the electrical power distribution center to the inputs of loads; provide arc fault detection and protection for complex electrical systems, such as aircraft power systems, at various frequencies; detect arc faults without relying on knowledge of load signatures; detect series and parallel arc faults in a timely manner for both AC and DC electric power systems; allow proper arc fault detection, protection, and operation for utility (50/60 Hz), or aerospace Fixed Frequency (400 Hz) or Wide Variable Frequency (360-800 Hz) electric power systems for aerospace environments; differentiate arc faults from cross-talk, common source impedance feedback, normal load signatures both in steady state and during normal and abnormal electric power system transients; provide excellent noise immunity against all types of switching devices and potential cross-talk among adjacent power lines; do not cause false or nuisance trips due to externally conducted or radiated interference signals; and are applicable to a wide variety of environments.

We claim:

1. An apparatus for detecting arc faults, said apparatus comprising:
   a master node for digitally detecting a current signal and a voltage signal at a first point in a wiring system;
   a slave node for digitally detecting a current signal and a voltage signal at a second point in said wiring system; and
   a detection unit for detecting an arc fault in said wiring system by comparing said current signals from said master node and from said slave node and comparing said voltage signals from said master node and from said slave node by;
   monitoring a time variation of said current signal from said master node,
   monitoring a time variation of said voltage signal from said slave node,
   calculating a difference between said current signals from said master node and from said slave node, when said time variation of said current signal has an abnormal value, and
   calculating a difference between said voltage signals from said master node and from said slave node, when said time variation of said voltage signal has an abnormal value.

2. The apparatus for detecting arc faults according to claim 1, wherein said master node and said slave node are synchronized to each other with a timing signal.

3. The apparatus for detecting arc faults according to claim 1, wherein said master node, said slave node, and said detection unit communicate with each other through a wireless communication pathway or through at least one Controller Area Network bus.

4. The apparatus for detecting arc faults according to claim 1, wherein said detection unit is associated with said master node or with said slave node.

5. The apparatus for detecting arc faults according to claim 1, wherein
   a difference between said current signals from said master node and from said slave node contains arcing content during a parallel arc fault, and
   a difference between said voltage signals from said master node and from said slave node contains arcing content during a series arc fault.

6. The apparatus for detecting arc faults according to claim 1, wherein
   a difference between said voltage signals from said master node and from said slave node is not impacted by signals induced into a wire in said wiring system by cross-talk or common source impedance feedback, and
   a difference between said current signals from said master node and from said slave node is not impacted by signal characteristics of loads connected to said master node or to said slave node.

7. The apparatus for detecting arc faults according to claim 1, wherein said master node is associated with an electrical power distribution center, and said slave node is located at the input terminal of a load.

8. An apparatus for detecting arc faults, said apparatus comprising:
   a master node for detecting a current signal and a voltage signal at a first point in a wiring system;
   a slave node for detecting a current signal and a voltage signal at a second point in said wiring system, wherein an arc fault is detected in said wiring system by comparing said current signals from said master node and from said slave node, and comparing said voltage signals from said master node and from said slave node;
   said master node samples said voltage and current signals at said first point, monitors a time variation of its current signal to capture an abnormal current occurrence and calls for current signal data from said slave node when an abnormal current occurrence is observed;

said slave node samples said voltage and current signals at said second point, monitors a time variation of its voltage signal to capture an abnormal voltage occurrence, and informs said master node when an abnormal voltage occurrence is observed: and a communication pathway for data and timing communication between said master node and said slave node.

9. The apparatus for detecting arc faults according to claim 8, wherein said master node and said slave node are synchronized to each other with a timing signal and exchange data via said communication pathway.

10. The apparatus for detecting arc faults according to claim 8, wherein said communication pathway includes a wireless communication pathway or at least one Controller Area Network bus.

11. The apparatus for detecting arc faults according to claim 8, wherein a difference between said current signals from said master node and from said slave node contains arcing content during a parallel arc fault, and a difference between said voltage signals from said master node and from said slave node contains arcing content during a series arc fault.

12. The apparatus for detecting arc faults according to claim 8, wherein an arc fault in said wiring system is detected by calculating a root mean square for a difference between said current signals or between said voltage signals from said master node and from said slave node, and comparing said root mean square with a threshold.

13. The apparatus for detecting arc faults according to claim 8, wherein a difference between said voltage signals from said master node and from said slave node is not impacted by signals induced into a wire in said wiring system by cross-talk or common source impedance feedback, and a difference between said current signals from said master node and from said slave node is not impacted by signal characteristics of loads connected to said master node or to said slave node.

14. The apparatus for detecting arc faults according to claim 8, wherein said master node is associated with an electrical power distribution center, and said slave node is located at the input terminal of a load.

15. A method of detecting arc faults, said method comprising:

detecting a current signal and a voltage signal at a first point in a wiring system;

detecting a current signal and a voltage signal at a second point in said wiring system;

detecting an arc fault in said wiring system by comparing said current signals at said first and second points, and comparing said voltage signals at said first and second points;

communicating data and timing information between said first point and said second point;

wherein said step of detecting a current signal and a voltage signal at said first point includes sampling said voltage and current signals at said first point, and monitoring a time variation of said current signal at said first point to capture an abnormal current occurrence, wherein said step of detecting a current signal and a voltage signal at said second point includes sampling said voltage and current signals at said second point, and monitoring a time variation of said voltage signal at said second point to capture an abnormal voltage occurrence, and wherein said communication of data and timing information includes calling for current signal data from said second point when an abnormal current occurrence is observed, and calling for voltage signal data from said first point when an abnormal voltage occurrence is observed.

16. The method of detecting arc faults as recited in claim 15, wherein communication data and timing information from a master node at the said first point and a slave node at said second point are synchronized with each other with a timing signal.

17. The method of detecting arc faults as recited in claim 15, wherein a difference between said current signals from said first and second points contains arcing content during a parallel arc fault, and a difference between said voltage signals from said first and second points contains arcing content during a series arc fault.

* * * * *